(12) United States Patent
Hoshi et al.

(10) Patent No.: US 7,542,865 B2
(45) Date of Patent: Jun. 2, 2009

(54) ABNORMALITY DETERMINATION DEVICE OF CYLINDER PRESSURE SENSOR

(75) Inventors: Shinya Hoshi, Kariya (JP); Hiroshi Haraguchi, Kariya (JP); Youhei Morimoto, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/802,988

(22) Filed: May 29, 2007

(65) Prior Publication Data

US 2007/0277591 A1    Dec. 6, 2007

(30) Foreign Application Priority Data

May 30, 2006    (JP) .............................. 2006-149231

(51) Int. Cl.
*G01M 19/00* (2006.01)
(52) U.S. Cl. ...................... 702/106; 73/1.59; 73/35.05; 73/118.1; 123/406.48; 123/435; 701/114; 701/108
(58) Field of Classification Search .................. 702/116; 73/1.59, 35.05, 118.1, 119 A; 123/672, 480, 123/299, 295, 305, 406.48, 435, 406.37, 123/406.14, 406.28, 406.34; 701/104, 103, 701/114, 108
See application file for complete search history.

(56) References Cited

U.S. PATENT DOCUMENTS

| 5,076,098 | A   |   | 12/1991 | Miwa |             |
|-----------|-----|---|---------|------|-------------|
| 5,703,285 | A   | * | 12/1997 | Shimizu et al. | 73/118.1 |
| 5,765,532 | A   | * | 6/1998  | Loye | 123/435     |
| 5,878,717 | A   | * | 3/1999  | Zur Loye | 123/435 |
| 5,965,807 | A   | * | 10/1999 | Yamashita et al. | 73/129 |
| 7,124,020 | B2  | * | 10/2006 | Vermonet et al. | 701/114 |
| 7,260,470 | B2  | * | 8/2007  | Damitz et al. | 701/114 |
| 2005/0125140 | A1 | * | 6/2005 | Vermonet et al. | 701/114 |
| 2006/0102147 | A1 | * | 5/2006 | Norimoto et al. | 123/406.47 |
| 2006/0107936 | A1 | * | 5/2006 | Mazet | 123/672 |
| 2006/0180119 | A1 | * | 8/2006 | Winstead | 123/198 F |
| 2006/0241852 | A1 | * | 10/2006 | Damitz et al. | 701/114 |

FOREIGN PATENT DOCUMENTS

| JP | 2002-242750 |   | 8/2002 |
|----|-------------|---|--------|
| JP | 2002242750  A | * | 8/2002 |
| JP | 2005-344513 |   | 12/2005 |

* cited by examiner

*Primary Examiner*—Carol S Tsai
(74) *Attorney, Agent, or Firm*—Nixon & Vanderhye P.C.

(57) ABSTRACT

An abnormality determination device of a cylinder pressure sensor calculates a gain (sensing sensitivity coefficient) and an offset (bias) indicating an output characteristic of the cylinder pressure sensor. The device determines existence or nonexistence of an abnormality in the gain and the offset respectively. When the device determines that the abnormality exists, the device performs failsafe processing set in modes different from each other between the case of the abnormality in the gain and the case of the abnormality in the offset. As the failsafe processing in the case of the abnormality in the gain, the device performs processing for substantially prohibiting usage of a sensor value of the cylinder pressure sensor in control (fuel injection timing control) by using an alternative value (specified value) instead of the sensor value of the cylinder pressure sensor.

16 Claims, 7 Drawing Sheets

ABNORMALITY DETERMINATION DEVICE OF CYLINDER PRESSURE SENSOR

CROSS REFERENCE TO RELATED APPLICATION

This application is based on and incorporates herein by reference Japanese Patent Application No. 2006-149231 filed on May 30, 2006.

BACKGROUND OF THE INVENTION

1. Field of the Invention

The present invention relates to an abnormality determination device for determining existence or nonexistence of an abnormality in a cylinder pressure sensor that senses cylinder pressure of an internal combustion engine.

2. Description of Related Art

An engine (internal combustion engine) combusts a mixture gas in a combustion chamber and works by depressing a piston with combustion pressure. Therefore, the combustion pressure is a parameter directly indicating a combustion state. If the combustion state is grasped, estimation of a fuel injection amount or combustion temperature, detection of knocking, detection of a peak position of the combustion pressure, detection of misfire and the like are enabled. Therefore, the combustion pressure is used in various kinds of engine control such as control of fuel injection timing or an air fuel ratio.

A general and practical method of sensing the combustion pressure provides a cylinder pressure sensor in a cylinder and senses the cylinder pressure of the engine, and furthermore, the cylinder pressure as of the combustion (combustion pressure) based on an output of the cylinder pressure sensor. However, it is not always true that the output of the cylinder pressure sensor is a proper value. For example, drift can be caused in the output signal due to external factors such as change in temperature such that an unnecessary offset (bias) is added to the sensor value or an error can be caused in a gain (sensing sensitivity coefficient) due to a characteristics variation of the sensor (originating in manufacturing tolerance and the like) or aging. Therefore, conventional methods of compensating the error by calculating the gain and the offset have been proposed, for example, as described in JP-A-2002-242750.

The device described in JP-A-2002-242750 obtains outputs Sr1, Sr2 (sensor values) of the cylinder pressure sensor and reference pressure values P1, P2 (references for sensor value correction) at two crank-angle positions in a compression stroke. The device calculates a gain A and an offset B by solving following simultaneous equations (Expression (1)) based on a polytropic change during the compression stroke.

$$P1 = A \times Sr1 + B,$$

$$P2 = A \times Sr2 + B \quad \text{Expression (1)}$$

The device corrects the sensor value based on the gain A and the offset B. The device estimates the reference pressure values P1, P2 from an output of an intake pressure sensor outputted during an intake stroke and the like through computation.

Thus, the device can obtain the proper sensor output by correcting the sensor value even when a certain error arises in the sensor value. However, practically, a situation such as complete breakdown of the sensor, which cannot be handled by the correction, can occur. Therefore, it is desirable to perform suitable failsafe processing according to the degree of the abnormality of the sensor. As for this point, the device still has a room for improvement.

SUMMARY OF THE INVENTION

It is an object of the present invention to provide an abnormality determination device of a cylinder pressure sensor capable of performing suitable failsafe processing according to a degree of an abnormality in the sensor.

According to an aspect of the present invention, an abnormality determination device determines existence or nonexistence of an abnormality in a cylinder pressure sensor that is mounted in a cylinder of an engine for sensing cylinder pressure of the engine. The abnormality determination device calculates a gain (sensing sensitivity coefficient) and an offset (bias) representing an output characteristic of the cylinder pressure sensor. The abnormality determination device determines existence or nonexistence of an abnormality in each one of the calculated gain and offset. The abnormality determination device performs failsafe processing set in modes different from each other between the case of the abnormality in the gain and the case of the abnormality in the offset if it is determined that the abnormality exists.

Generally, the degree of the abnormality of the sensor differs between the case of abnormality in the gain and the case of the abnormality in the offset. The abnormality in the gain is more serious because the abnormality in the gain is basically an abnormality in the sensor. In such the case, there is a possibility that the signal includes a noise, and it is difficult to handle the abnormality in the gain only with the correction. The abnormality in the offset is a drift abnormality in an output signal due to external factors such as change in temperature in many cases. By handling the abnormality in the offset through suitable correction, the possibility of significant disturbance in the control can be reduced.

The above-described structure performs the abnormality determination of the gain and the offset respectively. Therefore, in the case where the output of the cylinder pressure sensor is abnormal, it can be determined which of the gain and the offset contains the abnormality based on the determination result. Furthermore, the failsafe processing is set in the modes different from each other between the case of the abnormality in the gain and the case of the abnormality in the offset. Thus, the failsafe processing suitable for the respective cases can be performed. With this structure, the suitable failsafe processing is performed based on which of the gain and the offset contains the abnormality, i.e., based on the degree of the abnormality of the sensor.

The failsafe processing can be arbitrarily set in accordance with the use, the specification and the like of the cylinder pressure sensor. Thus, not only the case that can be handled with the correction but also the case that cannot be handled with the correction can be flexibly handled by suitably setting the failsafe processing.

If the existence or nonexistence of the abnormality in the gain and the existence or nonexistence of the abnormality in the offset can be detected both, it can also be detected whether the abnormalities occur in both of the gain and the offset. It is also effective to set failsafe processing in the case where the abnormalities occur in both of the gain and the offset differently from the failsafe processing in the case of the abnormality in the gain or the offset.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
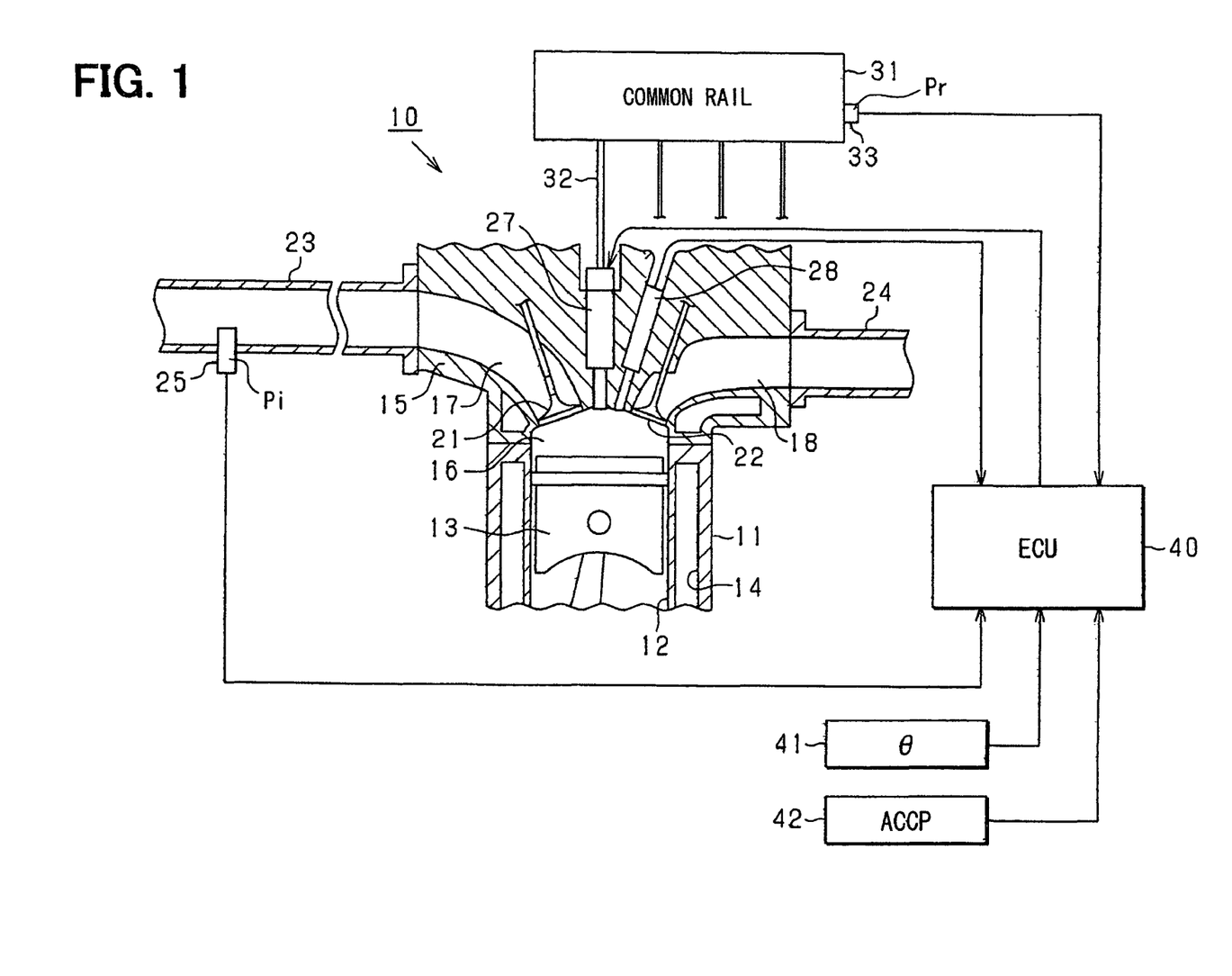
FIG. 1 is a schematic diagram showing a fuel injection control system of a vehicular engine having an abnormality determination device of a cylinder pressure sensor according to an embodiment of the present invention.

Referring to FIG. 1, a common rail fuel injection control system of a vehicular diesel engine according to an embodiment of the present invention is illustrated. FIG. 1 is a schematic diagram showing a vehicle control system, to which an abnormality determination device of a cylinder pressure sensor according to the present embodiment is applied. As shown in FIG. 1, the system includes an internal combustion engine 10 as the diesel engine, various sensors and an ECU 40 (electronic control unit) for controlling the engine 10, and the like.

The engine 10 is structured such that pistons 13 are accommodated in cylinders 12 (only one cylinder is illustrated in FIG. 1 for the sake of simplicity) formed in a cylinder block 11 and a crankshaft as an output shaft (not shown) is rotated by reciprocation of the pistons 13. A coolant channel 14 is formed in the cylinder block 11 to cool the engine 10 with a coolant. A cylinder head 15 is fixed to an upper end face of the cylinder block 11. A combustion chamber 16 is defined between the cylinder head 15 and an upper face of the piston 13.

An intake port 17 and an exhaust port 18 opening into the combustion chamber 16 are formed in the cylinder head 15. The intake port 17 and the exhaust port 18 are respectively opened and closed by an intake valve 21 and an exhaust valve 22, which are driven by a cam or cams (not shown). An intake pipe 23 for suctioning an ambient air is connected to the intake port 17. An exhaust pipe 24 for discharging a combustion gas is connected to the exhaust port 18. An intake pressure sensor 25 for sensing intake pipe pressure Pi is provided in the intake pipe 23.

An electromagnetic injector 27 and a cylinder pressure senor 28 are provided in the cylinder head 15. The injector 27 is arranged such that its injection hole is directed to the combustion chamber 16 from above and supplies fuel into the combustion chamber 16 through injection. The cylinder pressure sensor 28 senses pressure (cylinder pressure) in the combustion chamber 16. Although only one injector 27 and one cylinder pressure sensor 28 provided in one cylinder 12 are illustrated for the sake of simplicity in FIG. 1, such the injectors and the cylinder pressure sensors are provided for the respective cylinders of the engine 10. The fuel is injected and supplied into the respective cylinders through valve-opening drive of the injectors, and the cylinder pressures of the cylinders are sensed with the cylinder pressure sensors.

The injectors of the engine 10 including the injector 27 are connected to a common rail 31 as a pressure accumulation pipe through high-pressure fuel pipes 32. a fuel pump (not shown) continuously supplies the high-pressure fuel to the common rail 31 to accumulate the fuel in the common rail 31 at high pressure corresponding to injection pressure. a fuel pressure sensor 33 for sensing the fuel pressure (actual common rail pressure Pr) in the common rail 31 is provided in the common rail 31. thus, original pressure of the fuel to be injected and supplied through each injector can be monitored at any time.

The vehicle (not shown) is equipped with a crank angle sensor 41 for sensing engine rotation speed, an accelerator sensor 42 for sensing an accelerator operation amount ACCP (accelerator position) made by a driver and the like for vehicle control in addition to the above-described sensors.

The ECU 40 performing the vehicle control as an electronic control unit is equipped with a well-known microcomputer (not shown) and controls the engine 10 based on the sensing signals successively inputted from the above-described various sensors. The microcomputer mounted in the ECU 40 consists of computation units and storage units such as a CPU (basic processing unit) for performing various kinds of computation, a main memory consisting of a RAM or the like, a ROM, and a data storage memory consisting of an EEPROM or the like as an electrically rewritable nonvolatile memory. The ROM beforehand stores various types of programs related to the engine control including an abnormality determination program for the cylinder pressure sensor 28. The data storage memory (EEPROM) beforehand stores various kinds of control data including design data of the engine 10.

In the system, the ECU 40 executes the computation and the various types of programs to determine the optimum fuel injection amount and injection timing on the basis of engine operation information such as the engine rotation speed and the accelerator position ACCP. The ECU 40 outputs an injection control signal to the injector 27 in accordance with the optimum amount and the optimal timing. Thus, the fuel injection from the injector 27 to the combustion chamber 16 is controlled.

The ECU 40 also controls the injection timing of the fuel. For example, the ECU 40 calculates actual fuel ignition timing (actual ignition timing), i.e., combustion start timing, based on the output of the cylinder pressure sensor 28 (cylinder pressure). The ECU 40 controls the fuel injection timing based on the calculated actual ignition timing so that the injector 27 performs the fuel injection at the optimal timing. In such the fuel injection timing control, feedback control of the fuel injection timing is performed based on the output of the cylinder pressure sensor 28 (cylinder pressure).

As described above, it is not always true that a proper value is obtained as the output of the cylinder pressure sensor 28. Therefore, also in the present embodiment, as in the system of JP-A-2002-242750, a gain and an offset are calculated and the sensor value of the cylinder pressure sensor 28 is corrected at any time (for example, periodically) by using the calculated values (gain and offset). Thus, an error caused in the sensor value is compensated (corrected). Moreover, in the present embodiment, it is determined whether an abnormality exists in the gain and the offset respectively. If the existence of the abnormality is determined in the determination, failsafe processing set in modes different from each other between the case of the gain abnormality and the case of the offset abnormality is performed. Thus, suitable failsafe processing is performed in accordance with the degree of the abnormality in the sensor.

Figure 2:
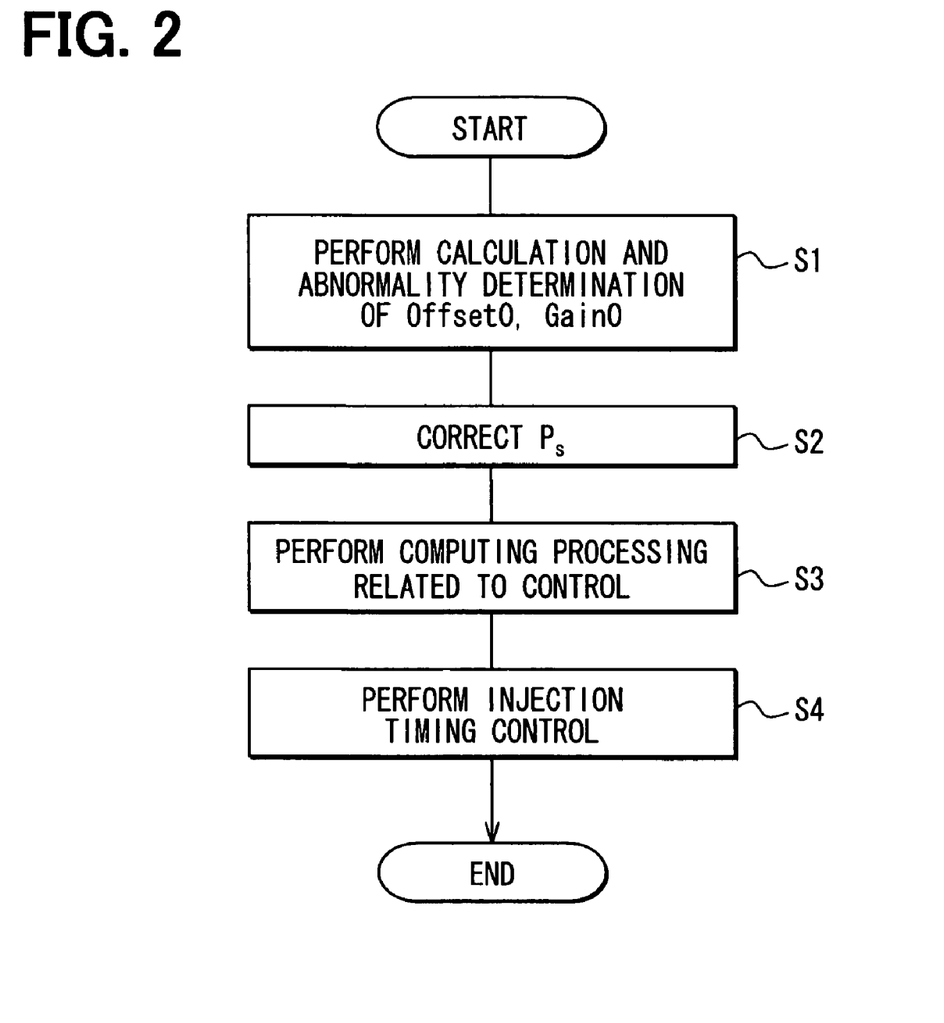
FIG. 2 is a flowchart showing processing steps of fuel injection timing control according to the FIG. 1 embodiment.

Next, a mode of the sensor value correction of the cylinder pressure sensor 28 according to the present embodiment will be explained with reference to FIGS. 2 to 6. An example in which the sensor value correction is applied to the fuel injection timing control will be explained below. FIG. 2 is a flowchart showing processing steps of the fuel injection timing control. Basically, a series of the processing shown in FIG. 2 is also executed through computation and execution of the various types of programs by the ECU 40.

As shown in FIG. 2, first in the control, Step S1 calculates an offset Offset0 and a gain Gain0 and performs abnormality determination of the calculated values Offset0, Gain0. Following Step S2 corrects the cylinder pressure Ps based on the gain Gain0 and the offset Offset0 calculated at Step S1. Following Step S3 performs computing processing related to the control such as the calculation of the actual ignition timing based on the cylinder pressure corrected at Step S2. Following Step S4 controls the fuel injection timing of each cylinder of the engine 10 based on the computation result of Step S3. Thus, in the present embodiment, while the sensor value correction of the cylinder pressure sensor 28 is performed, the fuel injection timing is controlled based on the corrected value. In the correction of the sensor value, the gain and the offset are calculated and the sensor value is corrected (i.e., error is compensated) based on comparison between the calculated values and reference values.

Next, the processing of Step S1 of FIG. 2 will be explained in more detail with reference to FIGS. 3 to 6. In the processing of Step S1, the calculation and the abnormality determination of the offset and the gain are performed separately and in parallel. Therefore, in the case where the processing of the calculation and the abnormality determination of the gain interferes with the processing of the calculation and the abnormality determination of the offset, a process waiting time or the like may be suitably set in order to avoid the interference as needed.

Next, the processing related to the offset will be explained with reference to FIGS. 3 and 4, and then, the processing related to the gain will be explained with reference to FIGS. 5 and 6.

Figure 3:
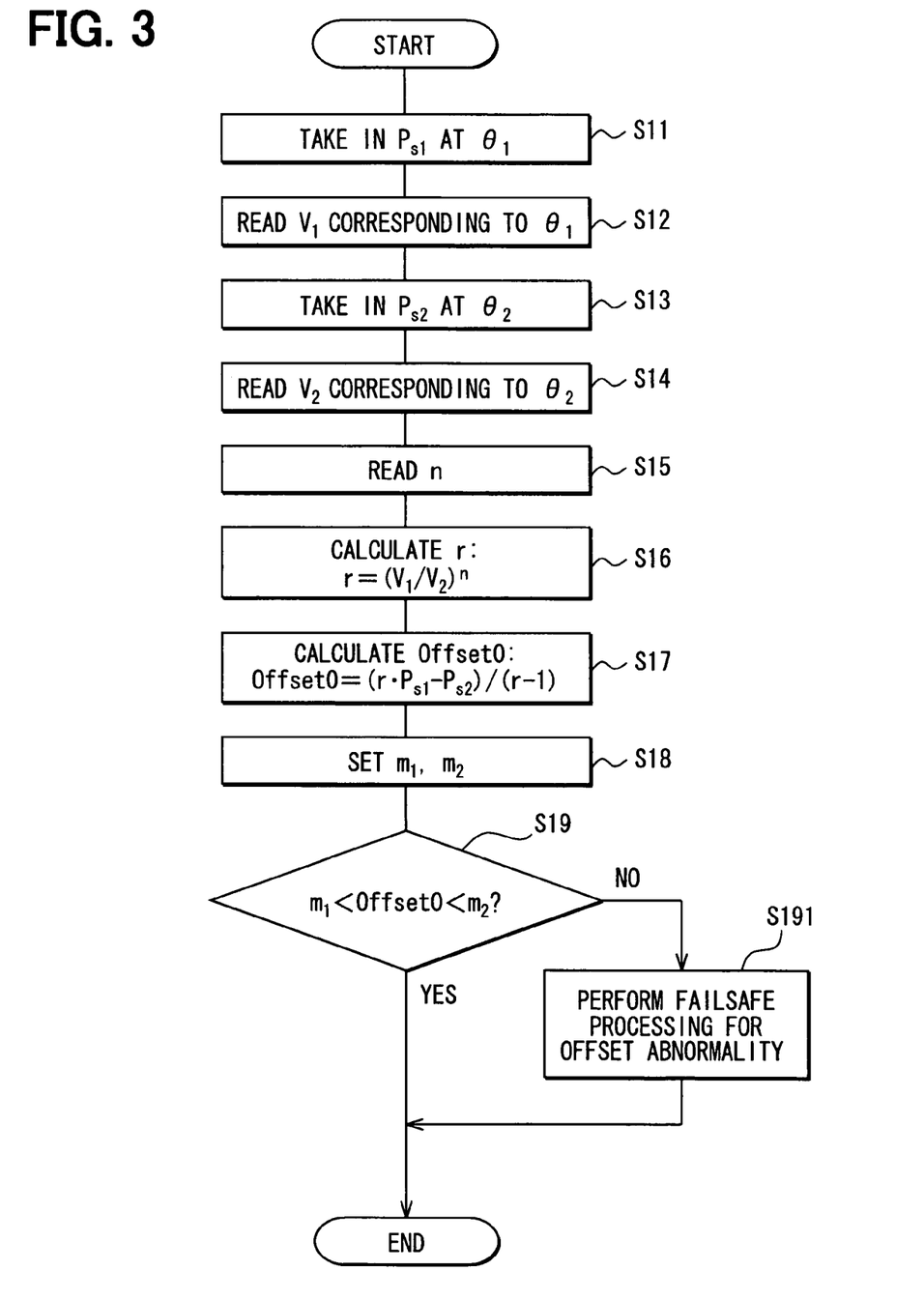
FIG. 3 is a flowchart showing processing steps of calculation and abnormality determination of an offset according to the FIG. 1 embodiment.

FIG. 3 is a flowchart showing processing steps of the processing concerning the calculation and the abnormality determination of the offset. FIGS. 4A and 4B are graphs showing a mode of the processing. FIG. 4A is a graph showing a relationship between true pressure Pt (actual cylinder pressure) and the output Ps of the cylinder pressure sensor 28. In FIG. 4A, a solid line shows an output characteristic (reference characteristic) including no offset. In FIG. 4A, broken lines show two kinds of output characteristics offset by certain offsets Offset0. FIG. 4B is a graph showing a relationship between a crank angle θ and the cylinder pressure P. In FIG. 4B, a solid line Ps shows an output characteristic of the cylinder pressure sensor 28, and a broken line Pt shows a characteristic of the true pressure. In FIG. 4B, a period from the crank angle $\theta 1$ to the crank angle $\theta 2$ corresponds to a compression stroke exhibiting a polytropic change in an operating period of the engine 10. In this period, the relationship between the pressure and the temperature in the combustion chamber 16 exhibits an intermediate change lying between an isothermal change and an adiabatic change, and physical characteristics stabilize.

As shown in FIG. 3, in a series of the processing, first, Step S11 takes in a sensor value Ps1 of the cylinder pressure sensor 28 at the crank angle $\theta 1$ (FIG. 4B) into the ECU 40. Subsequently, Step S12 reads out a cylinder volume V1 (volume of combustion chamber 16) corresponding to the crank angle position at the crank angle $\theta 1$ from the data storage memory (incorporated in ECU 40). Likewise, following Steps S13 and S14 take in a sensor value Ps2 of the cylinder pressure sensor 28 at the crank angle $\theta 2$ (FIG. 4B) and read out a cylinder volume V2 corresponding to a crank angle position at the crank angle $\theta 2$ from the data storage memory.

Following Step S15 reads out a polytropic exponent n corresponding to the period between the crank angles $\theta 1$, $\theta 2$ from the data storage memory (incorporated in ECU 40). The polytropic exponent is obtained based on the cylinder pressure (or intake pressure) and the engine rotation speed, for example. The polytropic exponent is mapped and stored on the basis of coordinate axes of the cylinder pressure and the engine rotation speed, for example.

Following Step S16 calculates a ratio r between pressures at the two crank angle positions (crank angles $\theta 1$, $\theta 2$) by following Expression (2) based on the parameters obtained at above-described steps.

$$r = (V1/V2)^n \quad \text{Expression (2)}$$

Following Step S17 calculates an offset Offset0 by following Expression (3) based on the parameters obtained at above-described steps, i.e., based on the sensor values Ps1, Ps2 of the cylinder pressure sensor 28 at the crank angles $\theta 1$, $\theta 2$ (Step S11, S13) and the pressure ratio r (Step S16).

Expression (3):

$$Offset0 = \frac{r \cdot Ps1 - Ps2}{r - 1}$$

Thus, the offset (bias) related to the output of the cylinder pressure sensor 28 is calculated through the above-described processing. In the case where the offset Offset0 is contained as shown by the broken lines in FIG. 4A, the output characteristic deviates from the original sensor output (true value Pt shown by solid line) as the reference value to a positive side or a negative side.

Then, it is determined whether an abnormality exists in the thus-calculated offset Offset0. First, Step S18 sets specified values m1, m2 respectively as a lower limit and an upper limit defining an allowable range. Following Step S19 determines whether an abnormality exists in the offset Offset0 based on the specified values m1, m2, i.e., whether an expression "m1<Offset0<m2" is satisfied. The specified values m1, m2 are decided based on engine design data such as the volume of the combustion chamber, experimental data or the like.

Figure 4A:
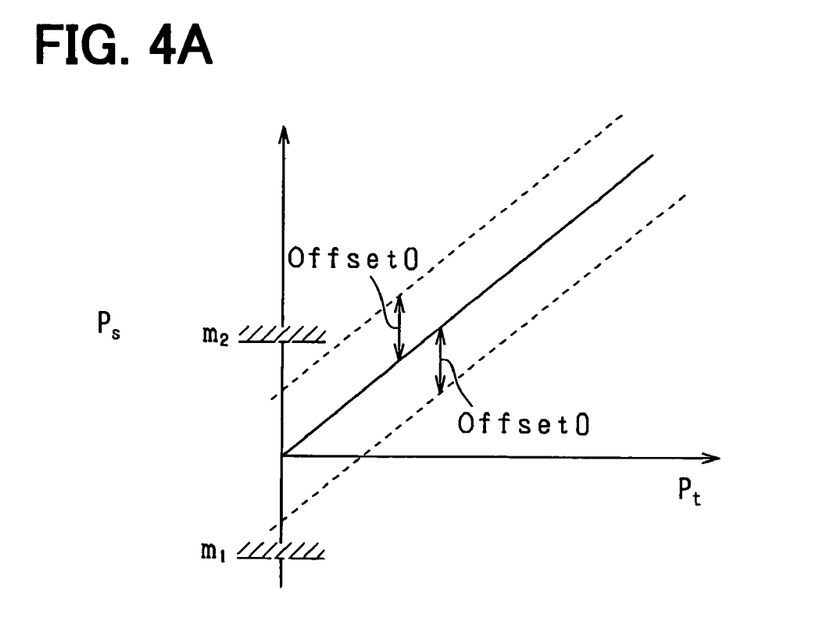
FIGS. 4A and 4B are graphs showing a processing mode of the calculation and the abnormality determination of the offset according to the FIG. 1 embodiment.
Figure 4B:
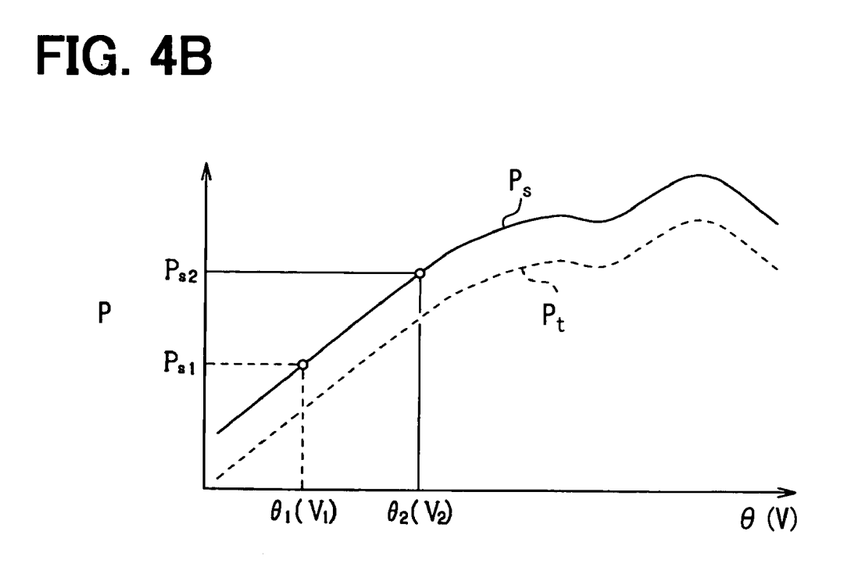

Even when the offset exists as shown by the broken lines in FIG. 4A, the abnormality determination of Step S19 provides determination indicative of a normality if the offset falls within the allowable range shown by chain double-dashed lines in FIG. 4A (range between specified values m1, m2). If Step S19 provides the determination indicating that the offset Offset0 is normal, this series of the processing of FIG. 3 is ended and the process shifts to Step S2 of FIG. 2.

If the offset Offset0 does not fall in the allowable range, Step S19 provides the determination indicating that the offset Offset0 is abnormal. In this case, Step S191 performs failsafe processing set beforehand as the processing to be performed when the offset is abnormal. Then, the series of the processing of FIG. 3 is ended. Then, the process shifts to Step S2 of FIG.

2 as in the normal case unless suspension of the control is commanded in the failsafe processing of Step S191.

In the present embodiment, a drift of an offset signal is corrected and, for example, a warning lamp (not shown) is lit to notify the driver of the existence of the abnormality in the cylinder pressure sensor as the failsafe processing of Step S191. That is, the control related to the flowchart of FIG. 3 is continued even after the failsafe processing is performed. After the end of a series of the processing of FIG. 3, the process shifts to Step S2 of FIG. 2.

The correction processing at Step S191 may be omitted if the correction processing at following Step S2 suffices. That is, the failsafe processing of the offset determined to be abnormal is performed by the correction processing of Step S2 in this case. The warning lamp is lit to report the abnormality to the vehicle occupant and to urge the vehicle occupant to take lasting corrective actions such as replacement or repair. The warning lamp may be lit before or after the correction. Instead of the warning lamp, other alarming devices such as a warning buzzer may be used.

Next, processing concerning the gain will be explained. FIG. 5 is a flowchart showing processing steps of processing related to calculation and abnormality determination of the gain. FIGS. 6A and 6B are graphs showing a mode of the processing. FIG. 6A is a graph showing a relationship between the true pressure Pt (actual cylinder pressure) and the output Ps of the cylinder pressure sensor 28. In FIG. 6A, a solid line shows the output characteristic (reference characteristic) in the case where the gain does not include an error. Broken lines show two kinds of output characteristics in the case where the gain includes the error. FIG. 6B is a graph showing a relationship between the crank angle $\theta$ and the cylinder pressure P. In FIG. 6B, a solid line Ps shows the output characteristic of the cylinder pressure sensor 28, and a broken line Pk shows the characteristic of the reference pressure (reference value for sensor value correction). In FIG. 6B, a period from a crank angle $\theta 1$ to a crank angle $\theta 2$ corresponds to the compression stroke exhibiting the polytropic change as in FIG. 4B.

Figure 5:
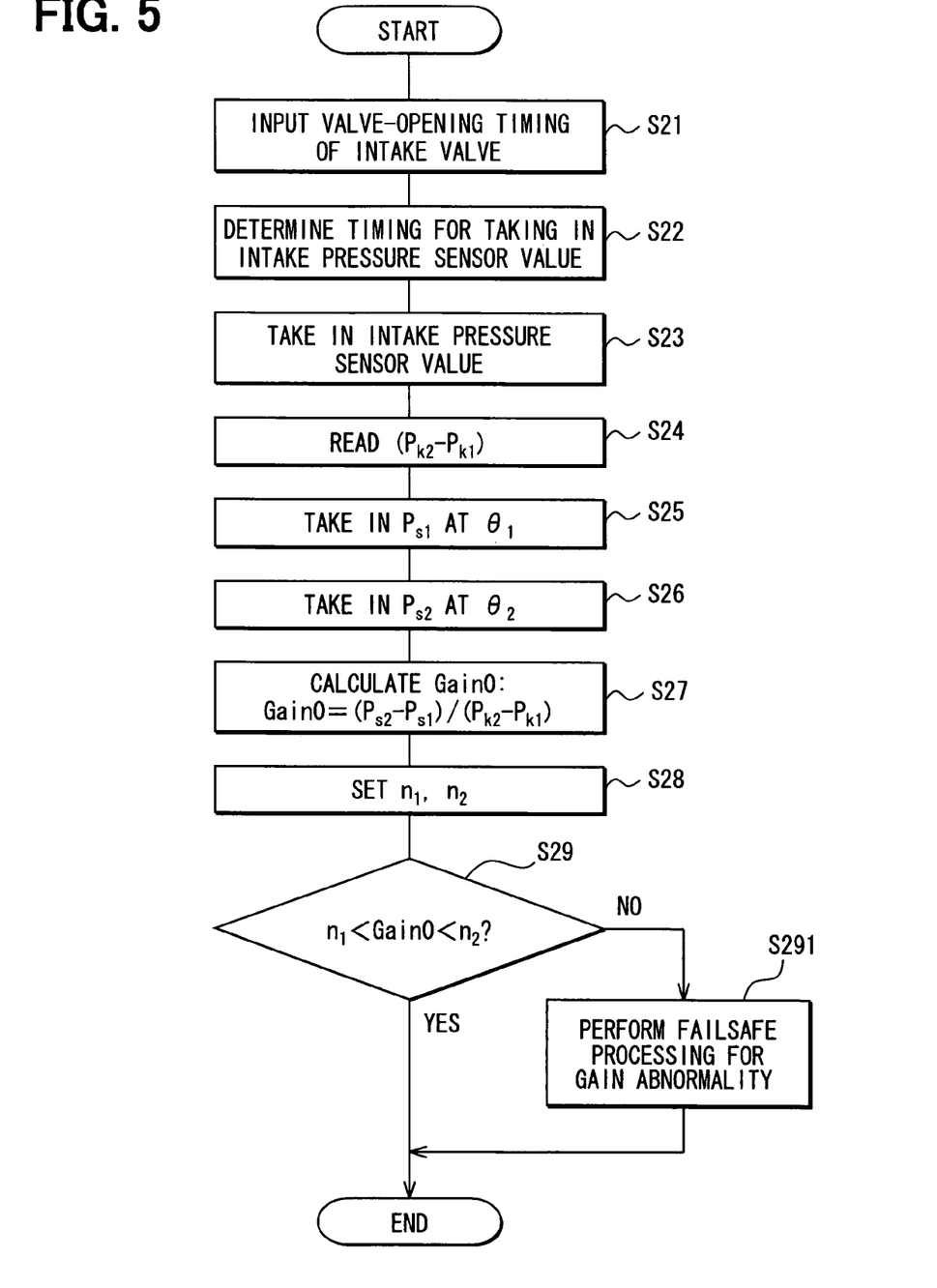
FIG. 5 is a flowchart showing processing steps of calculation and abnormality determination of a gain according to the FIG. 1 embodiment.

As shown in FIG. 5, in a series of the processing, first, Step S21 inputs the valve opening timing of the intake valve 21 to the ECU 40. Then, following Step S22 determines the timing for taking in the sensor value of the intake pressure sensor 25, e.g., at 5° CA before valve-closing timing, based on the value inputted at Step S21. Following Step S23 takes in the sensor values of the intake pressure sensor 25 corresponding to the crank angles $\theta 1$, $\theta 2$ (FIG. 6B) based on the timing for taking in the sensor values. Following Step S24 reads the pressure difference "Pk2−Pk1" (FIG. 6B) between the reference pressures Pk1, Pk2 corresponding to the taken sensor values from the data storage memory (mounted in ECU 40).

Then, Steps S25, S26 take in the sensor values Ps1, Ps2 of the cylinder pressure sensor 28 at crank angles $\theta 1$, $\theta 2$ into the ECU 40 respectively. Following Step S27 calculates the gain Gain0 based on the parameters obtained at the above-described steps, i.e., the reference pressure difference "Pk2−Pk1" (Step S24) and the sensor values Ps1, Ps2 of the cylinder pressure sensor 28 at the crank angles $\theta 1$, $\theta 2$ (Steps S25, S26), by following Expression (4).

$$\text{Gain0} = (Ps2 - Ps1)/(Pk2 - Pk1) \quad \text{Expression (4)}$$

Through this processing, the gain (sensing sensitivity coefficient) concerning the output of the cylinder pressure sensor 28 is calculated. As shown by broken lines in FIG. 6A, when the gain includes the error, the output characteristic shifts to the positive side (such that inclination increases) or negative side (such that inclination decreases) from the original sensor output (solid line) as a reference value.

Next, it is determined whether an abnormality exists in the calculated gain Gain0. First, Step S28 decides specified values n1, n2 as a lower limit and an upper limit for deciding an allowable range. Following Step S29 determines whether an abnormality exists in the gain Gain0 based on the specified values n1, n2, i.e., based on whether an expression "n1<Gain0<n2" is satisfied. The specified values n1, n2 are decided based on the engine design data such as the volume of the combustion chamber, the experimental data or the like.

Figure 6A:
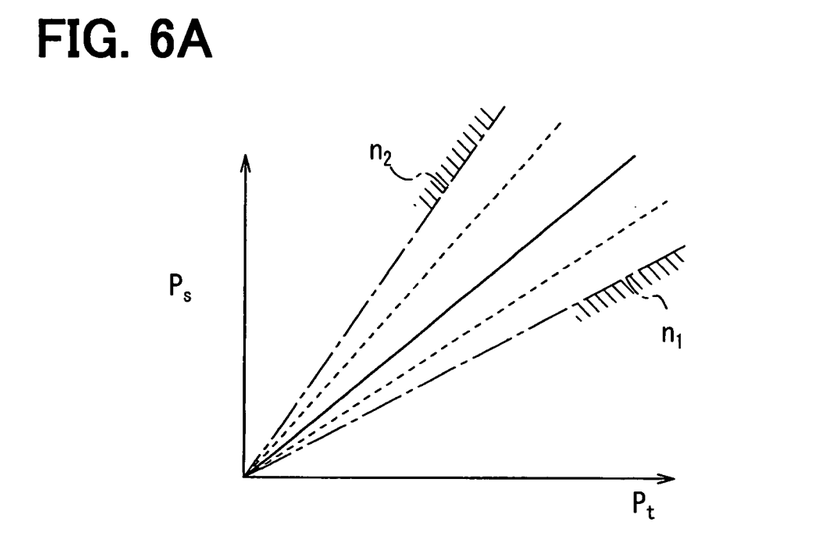
FIGS. 6A and 6B are graphs showing a processing mode of the calculation and the abnormality determination of the gain according to the FIG. 1 embodiment.
Figure 6B:
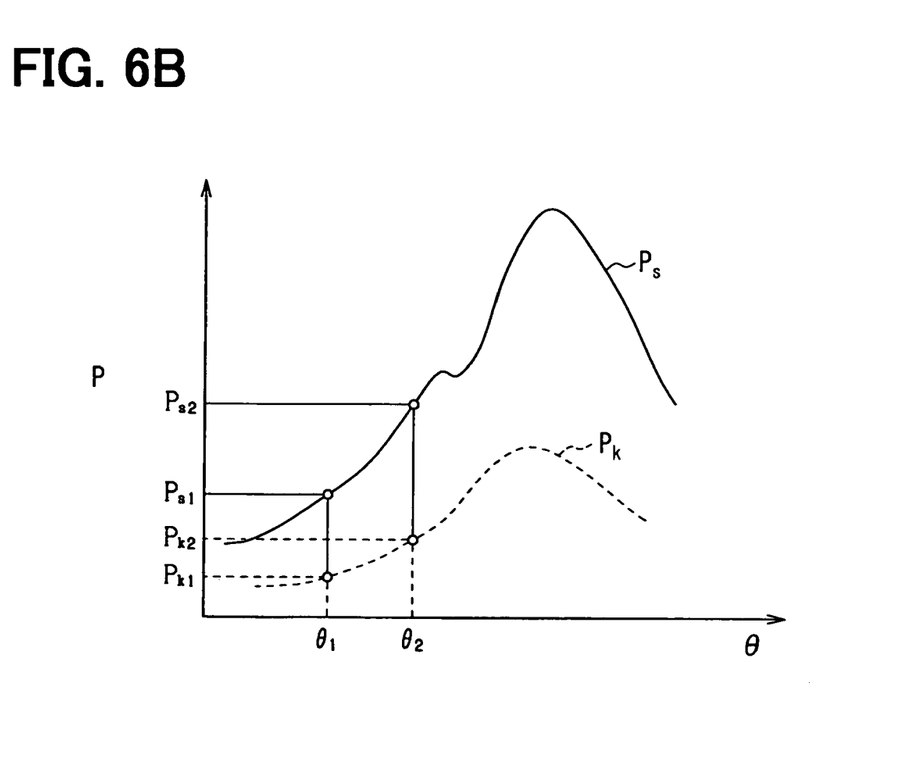

Even when the gain includes the error as shown by the broken lines in FIG. 6A, the abnormality determination at Step S29 provides the determination indicating the normality if the gain Gain0 falls within the allowable range (range between specified values n1, n2) shown by chain double-dashed lines in FIG. 6A. If Step S29 determines that the gain Gain0 is normal, the series of the processing of FIG. 5 is ended and the process shifts to Step S2 of FIG. 2.

If the gain Gain0 does not fall within the allowable range, Step S29 determines that the gain Gain0 is abnormal. In this case, Step S291 performs failsafe processing, which is set beforehand as the processing to be performed when the gain is determined to be abnormal. Then, the series of the processing of FIG. 5 is ended. The process shifts to Step S2 of FIG. 2 as in the case of the normality unless the suspension of the control is commanded in the failsafe processing of Step S291. In the present embodiment, as the failsafe processing of Step S291, the feedback control concerning the fuel injection timing control using the output of the cylinder pressure sensor 28 is switched to open-loop control. Thus, a predetermined specified value is set as an alternative value of the sensor value of the cylinder pressure sensor 28, enabling evacuation travel (limp home travel). That is, the control related to the flowchart of FIG. 5 is once interrupted and is switched to the control of the evacuation travel by the failsafe processing. The specified value used as the alternative value should be preferably chosen and set at a value adaptable to as general and wide a variety of anticipated situations as possible.

Thus, in the present embodiment, the failsafe processing is performed in the modes set differently from each other between the case of the abnormality in the gain and the case of the abnormality in the offset by using the sensor value of the cylinder pressure sensor 28 when the fuel injection timing control is performed. Thus, the suitable failsafe processing is performed in accordance with the degree of the abnormality of the sensor.

The above-described embodiment exerts following effects, for example.

(1) The cylinder pressure sensor abnormality determination device (constituted by ECU 40 in this embodiment) for determining the existence or nonexistence of the abnormality in the cylinder pressure sensor 28, which is provided in the cylinder 12 for sensing the cylinder pressure of the engine 10, calculates the gain (sensing sensitivity coefficient) and the offset (bias) indicating the output characteristic of the cylinder pressure sensor 28 and determines the existence or nonexistence of the abnormality in the gain and the offset respectively. If it is determined that the abnormality exists, the failsafe processing set in the modes different from each other between the case of the abnormality in the gain and the case of the abnormality in the offset is performed. Thus, the suitable failsafe processing can be performed respectively in the case where the abnormality exists in the gain and, the case where the abnormality exists in the offset.

(2) The gain and the offset are calculated separately by the independent formulas (Expression (3) and Expression (4)), each of which uses only one of the gain and the offset but does not use the other one as a variable. Thus, the gain and the offset do not affect each other at least in the calculation. Accordingly, it can be determined more exactly which of the gain and the offset includes the abnormality.

(3) The computation concerning the calculation of the gain and the computation concerning the calculation of the offset can be performed simultaneously (in parallel), which is advantageous with regard to a processing time.

(4) As the failsafe processing at the time when the abnormality occurs in the gain, the usage of the sensor value of the cylinder pressure sensor 28 in the control (fuel injection timing control) is substantially prohibited (Step S291 of FIG. 5) by using the alternative value (specified value) instead of the sensor value of the cylinder pressure sensor 28. As the failsafe processing at the time when the abnormality occurs in the offset, the processing for applying the predetermined correction to the offset determined to be abnormal (Step S191 of FIG. 3) is performed. Thus, the desirable failsafe processing according to the degree of the abnormality of the sensor can be performed.

(5) After the offset determined to be abnormal is corrected, the abnormality of the offset is notified with the warning lamp. Thus, the security level can be improved.

(6) For the control that has been using the prohibited sensor value, the alternative value is set instead of the sensor value. Thus, the related control is continued and the trouble in the control due to the prohibition of the usage of the sensor value can be suppressed.

(7) Since the predetermined specified value is used as the alternative value, the fuel injection timing control can be easily continued without causing complication of the control.

(8) The determination of the existence or nonexistence of the abnormality related to the gain or the offset is performed based on whether the gain or the offset falls within the corresponding predetermined allowable range. Thus, the existence or nonexistence of the abnormality can be easily determined based on whether the gain or the offset falls within the range.

(9) The allowable ranges are changeable parameters (set at Step S18 of FIG. 3 and Step S28 of FIG. 5). Thus, the abnormality determination of the different abnormality degrees can be easily performed by changing the allowable ranges.

(10) The calculated gain and offset are used to correct the sensor value of the cylinder pressure sensor 28. The correction is invariably performed while the gain and the offset are normal. Thus, basically, appropriateness of the sensor output (sensor value) is invariably maintained. Furthermore, reduction of sensing accuracy of actual ignition timing (combustion start timing) and the like due to the abnormality in the output characteristic of the cylinder pressure sensor 28 can be suitably inhibited.

The above embodiment may be modified as follows, for example.

That is, in the determination of the existence or nonexistence of the abnormality in at least one of the gain and the offset, multiple different allowable ranges may be used instead of using only one allowable range. The determination of the existence or nonexistence of the abnormality may be performed based on whether the gain or the offset falls within each of the allowable ranges. Failsafe processing in modes different among the allowable ranges may be set.

Figure 7:
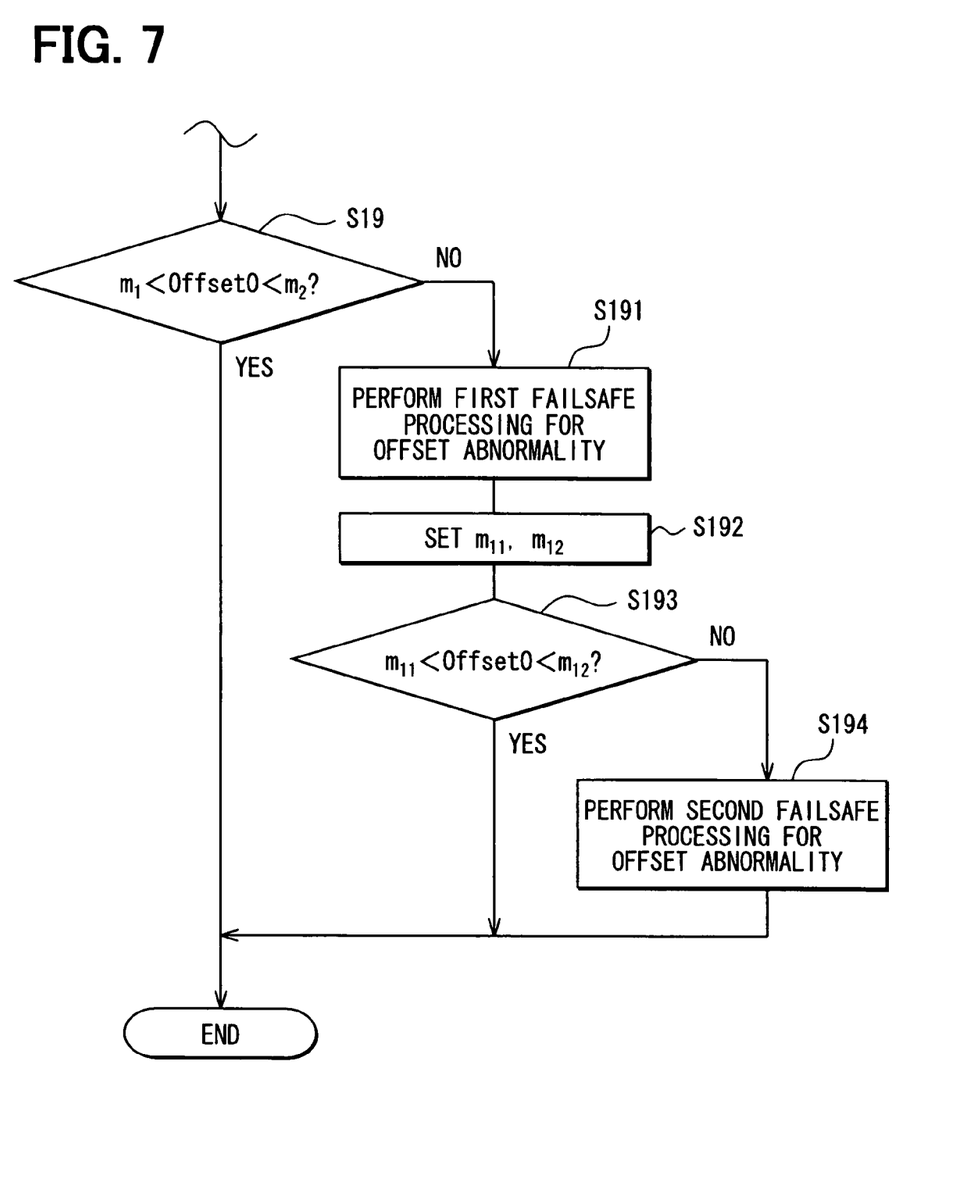
FIG. 7 is a flowchart showing processing of abnormality determination of an offset of a modified example of the FIG. 1 embodiment.

In this case, for example, as shown in FIG. 7, Step S192 for deciding the allowable range is set after Step S191 of FIG. 3, and specified values m11, m12 are set as a lower limit and an upper limit of the allowable range. Following Step S193 determines existence or nonexistence of an abnormality in the offset Offset0 based on the specified values m11, m12, i.e., based on whether an expression "m11<Offset0<m12" is satisfied. For example, the allowable range defined by the specified values m11, m12 is set wider than the allowable range defined by the specified values m1, m2 (Step S19), i.e., the allowable ranges widen stepwise. Step S193 provides determination indicative of normality if the offset Offset0 falls within the allowable range between the specified values m11, m12. Thus, the series of the processing is ended once. If the offset Offset0 does not fall within the allowable range, following Step S194 performs failsafe processing of a mode (second failsafe processing for offset abnormality) different from the failsafe processing of Step S191 (first failsafe processing for offset abnormality).

For example, the first failsafe processing for the abnormality in the offset corrects the offset and lights the warning lamp like the above-described embodiment, and the second failsafe processing for the abnormality in the offset substantially prohibits the usage of the sensor value by using the alternative value to perform the evacuation travel. Thus, the control is continued when the degree of the abnormality is low and the related control can be continued. The failsafe processing that stops the control is performed when the degree of the abnormality is high and the related control cannot be continued.

The first failsafe processing for the abnormality in the offset may light a yellow warning lamp and the second failsafe processing for the abnormality in the offset may light a red warning lamp. Thus, the driver can easily grasp the degree of the abnormality of the sensor.

Furthermore, an allowable range wider than the allowable range of Step S193 may be provided after Step S194 and third failsafe processing for the abnormality in the offset may be performed. The failsafe processing suitable for the degree of the abnormality can be performed more appropriately by setting the necessary number of the failsafe processing according to the specification, the use and the like of the cylinder pressure sensor 28. Also in this case, it is effective to set the above-described correction processing as one of the failsafe processing related to the narrower allowable range and to set the processing for prohibiting or restricting the usage of the sensor value (for example, by using alternative value) as one of the failsafe processing related to the wider allowable range respectively.

In the above modified example, the multiple allowable ranges for the abnormality determination of the offset are set. Alternatively, multiple allowable ranges may be provided for the gain or both of the gain and the offset.

By setting the multiple allowable ranges, the degree of the abnormality in the gain or the offset can be determined with higher accuracy. For example, when the normality is determined in the relatively wide allowable range but the abnormality is determined in the relatively narrow allowable range, it is understood that the degree of the abnormality corresponds to an intermediate range between the two allowable ranges. By setting the failsafe processing in the modes different between the degrees of the abnormality, the more suitable failsafe processing can be performed in accordance with the degree of the abnormality in addition to the distinction between the abnormality in the gain and the abnormality in the offset.

The existence or nonexistence of the abnormality in the gain and the existence or nonexistence of the abnormality in the offset can be detected both by performing the abnormality determination of both of the gain and the offset as in the above-described embodiment. Accordingly, it can also be detected whether the abnormalities occur in both of the gain and the offset. The determination processing of whether the abnormalities occur in both of the gain and the offset may be additionally set. Failsafe processing, which is different from the failsafe processing in the case of the abnormality in either the gain or the offset, may be performed if the abnormalities occur in both of the gain and the offset. There is a high possibility that the cylinder pressure sensor 28 is completely broken if both of the gain and the offset have the abnormalities. Therefore, as the failsafe processing in this case, processing for storing a diagnosis code related to the breakage of the sensor in the EEPROM or the like is effective.

The formulas for calculating the gain and the offset are not limited to the above-described formulas (Expressions (3) and (4)). Effects similar to the effects (2) and (3) can be achieved at least if the formulas for deriving the gain and the offset are independent formulas, one of which for deriving one of the gain and the offset does not use the other one of the gain and the offset as a variable. However, this is not an indispensable requisite. For example, like the simultaneous equations (Expression (1)) described in JP-A-2002-242750, a formula of the gain that uses the offset as a variable and a formula of the offset that uses the gain as a variable may be used in accordance with the use of the sensor and the like.

The mode of the correction in the failsafe processing may be set arbitrarily. Usually, simple correction for bringing the offset into the allowable range suffices as the correction of the offset. Specifically, since the error in the offset is the error due to the drift in many cases, the correction with respect to the drift is effective.

The mode of the failsafe processing may be set arbitrarily, for example, in accordance with the use or the specification of the cylinder pressure sensor 28 and the like. For example, as for the usage of the sensor value of the cylinder pressure sensor 28 in the control, the usage may be only suspended without performing any specific prohibition processing or the usage may be prohibited only in specific control (for example, fuel injection timing control), which can cause a serious result. Thus, various kinds of the failsafe processing can be performed.

Alternatively, the usage of only the sensor value after the abnormality is determined may be prohibited, and the last sensor value obtained while the normality of the gain and the offset is determined, i.e., the sensor value (continuously stored in RAM or EEPROM) obtained immediately before the abnormality is determined, may be set as the alternative value. In this case, the control can be performed by using the sensor value containing the minimum error at the time when the abnormality occurs.

An effect similar to the effect (1) can be achieved by setting the modes of the failsafe processing different from each other between the case of the abnormality in the gain and the case of the abnormality in the offset.

In the above-described embodiment, the intake port pressure during the air intake is used as the reference pressure (reference value for sensor value correction). Alternatively, for example, the reference pressure may be calculated based on the engine design data such as the volume of the combustion chamber, the engine control conditions such as the air fuel ratio or the engine coolant temperature, and the like.

In the above-described embodiment, the fuel injection timing control is referred to as an example. However, the use of the cylinder pressure sensor 28 is not limited to this. For example, the cylinder pressure sensor 28 can be effectively used for the control of the air fuel ratio or the like. Even in this case, the present invention can be applied in a mode similar to the above-described embodiment.

In the above-described embodiment, the allowable range is defined by changeable values. Alternatively, the allowable range may be defined by fixed values.

In the above-described embodiment, the common rail fuel injection control system of the vehicular diesel engine is referred to as an example. Fundamentally, the present invention can also be applied to a gasoline engine (direct injection engine) likewise.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An abnormality determination device for determining existence or nonexistence of an abnormality in a cylinder pressure sensor that is mounted in a cylinder of an engine for sensing cylinder pressure of the engine, the abnormality determination device comprising:

a calculating device that calculates a gain and an offset indicating an output characteristic of the cylinder pressure sensor;

a determining device that determines existence or nonexistence of an abnormality in each one of the calculated gain and offset; and a performing device that performs failsafe processing set in modes different from each other between the case of the abnormality in the gain and the case of the abnormality in the offset if the determining device determines that the abnormality exists, wherein the performing device performs at least processing for prohibiting or restricting usage of a sensor value of the cylinder pressure sensor in control as the failsafe processing in the case of the abnormality in the gain, and the performing device performs at least processing for applying predetermined correction to the offset determined to be abnormal as the failsafe processing in the case of the abnormality in the offset.

2. The abnormality determination device as in claim 1, further comprising:

a reporting device that reports the abnormality in the offset before or after the predetermined correction is applied to the offset determined to be abnormal.

3. The abnormality determination device as in claim 1, wherein the performing device prohibits the usage of the sensor value of the cylinder pressure sensor obtained after the determining device determines that the gain or the offset is abnormal as the processing for restricting the usage of the sensor value in the control in the failsafe processing, which is performed when the gain or the offset is abnormal, and sets an alternative value for the control using the prohibited sensor value.

4. The abnormality determination device as in claim 3, wherein the performing device uses a specified value or the last sensor value of the cylinder pressure sensor, which is obtained while normality of the gain and the offset is determined, as the alternative value.

5. An abnormality determination device for determining existence or nonexistence of an abnormality in a cylinder pressure sensor that is mounted in a cylinder of an engine for sensing cylinder pressure of the engine, the abnormality determination device comprising:

a calculating device that calculates a gain and an offset indicating an output characteristic of the cylinder pressure sensor;

a determining device that determines existence or nonexistence of an abnormality in each one of the calculated gain and offset; and a performing device that performs failsafe processing set in modes different from each other between the case of the abnormality in the gain and the case of the abnormality in the offset if the determining device determines that the abnormality exists;

wherein the determining device sets a plurality of different allowable ranges for the determination of the existence or nonexistence of the abnormality in at least one of the gain and the offset;

the determining device determines the existence or nonexistence of the abnormality in the gain or the offset based on whether the gain or the offset falls within each one of the allowable ranges;

the performing device performs the failsafe processing in modes different from each other among the different allowable ranges in the case where the existence of the abnormality is determined;

the allowable ranges for the determination of the existence or nonexistence of the abnormality in the offset are set such that the allowable ranges widen stepwise from a narrower allowable range to a wider allowable range, the performing device performs at least processing for applying predetermined correction to the offset determined to be abnormal as the failsafe processing related to the narrower allowable range, and the performing device performs at least processing for prohibiting or restricting usage of a sensor value of the cylinder pressure sensor in control as the failsafe processing related to the wider allowable range.

6. The abnormality determination device as in claim 5, wherein the calculating device calculates the gain and the offset separately by independent formulas, each of which uses only one of the gain and the offset but does not use the other one of the gain and the offset as a variable.

7. The abnormality determination device as in claim 6, wherein the calculating device calculates the gain by a formula substantially representing a following relationship: Gain0=(Ps2−Ps1)/(Pk2−Pk1), the calculating device calculates the offset by a formula substantially representing a following relationship: Offset0=(r·Ps1−Ps2)/(r−1), and Gain0 represents the gain, Ps1 and Ps2 are sensor values of the cylinder pressure sensor at two points of crank angular positions in a compression stroke exhibiting a polytropic change, Pk1 and Pk2 are reference pressures at the two points for correcting the sensor values, Offset0 is the offset, and r is a ratio between the cylinder pressures at the two points.

8. The abnormality determination device as in claim 5, further comprising:

a reporting device that reports the abnormality in the offset before or after the predetermined correction is applied to the offset determined to be abnormal.

9. The abnormality determination device as in claim 5, wherein the performing device prohibits the usage of the sensor value of the cylinder pressure sensor obtained after the determining device determines that the gain or the offset is abnormal as the processing for restricting the usage of the sensor value in the control in the failsafe processing, which is performed when the gain or the offset is abnormal, and sets an alternative value for the control using the prohibited sensor value.

10. The abnormality determination device as in claim 9, wherein the performing device uses a specified value or the last sensor value of the cylinder pressure sensor, which is obtained while normality of the gain and the offset is determined, as the alternative value.

11. The abnormality determination device as in claim 5, wherein the calculated gain and the calculated offset are used to correct a sensor value of the cylinder pressure sensor at least when the calculated gain and the calculated offset are normal.

12. An abnormality determination method for determining existence or nonexistence of an abnormality in a cylinder pressure sensor that is mounted in a cylinder of an engine for sensing cylinder pressure of the engine, the abnormality determination method comprising:

calculating a gain and an offset indicating an output characteristic of the cylinder pressure sensor;

determining existence or nonexistence of an abnormality in each one of the calculated gain and offset; and performing failsafe processing set in modes different from each other between the case of the abnormality in the gain and the case of the abnormality in the offset if the existence of the abnormality is determined;

prohibiting or restricting usage of a sensor value of the cylinder pressure sensor in control as the failsafe processing in the case of the abnormality in the gain; and applying predetermined correction to the offset determined to be abnormal as the failsafe processing in the case of the abnormality in the offset.

13. The method as in claim 12, further comprising:

reporting the abnormality in the offset before or after the predetermined correction is applied to the offset determined to be abnormal.

14. The method as in claim 12, further comprising prohibiting the usage of the sensor value of the cylinder pressure sensor and using an alternative value instead of the sensor value of the cylinder pressure sensor for the control.

15. The method as in claim 14, wherein a specified value or the last sensor value of the cylinder pressure sensor, which is obtained while normality of the gain and the offset is determined, is used as the alternative value.

16. The method as in claim 14, wherein the control is fuel injection timing control.

* * * * *